June 8, 1965  E. R. STOVER  3,187,502
ROCKET NOZZLE
Filed Jan. 23, 1961
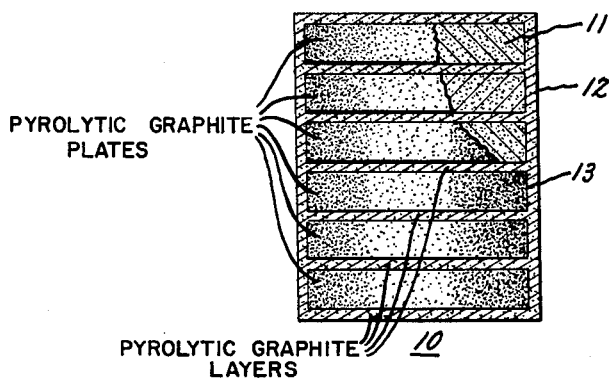
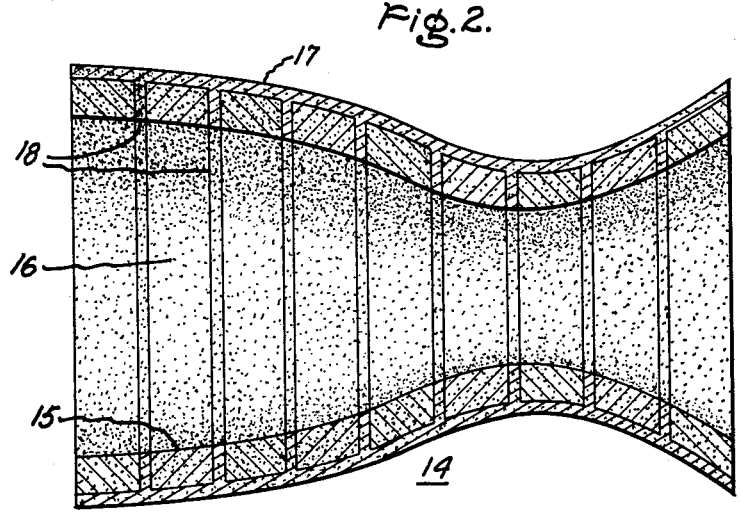
Inventor:
Edward R. Stover,
by Paul R. Webb, II
His Attorney.

United States Patent Office 3,187,502
Patented June 8, 1965

3,187,502
ROCKET NOZZLE
Edward R. Stover, Schenectady, N.Y., assignor to General Electric Company, a corporation of New York
Filed Jan. 23, 1961, Ser. No. 84,119
4 Claims. (Cl. 60—35.6)

This invention relates to composite articles and more particularly to composite articles of pyrolytic graphite.

Pyrolytic graphite is defined as a polycrystalline material made from carbonaceous gases by thermal decomposition or from a carbonaceous material by evaporation and deposition on a surface in which the planar graphite crystallites are aligned into a layer structure. It is useful as a high temperature material for bearings, seal rings, lamp filaments, furnace linings, neutron reactor moderators, and missile and space propulsion components.

A problem exists with pyrolytic graphite articles when such articles are subjected to erosion conditions. For example, a shaft bearing or seal ring wears at its inner or outer circumference while the surface of a pyrolytic graphite rocket nozzle is eroded by atmospheric conditions. Since the surface of a pyrolytic graphite article is in the plane of deposition where the graphite crystallites are aligned in a layer structure, such layers are easily sheared apart when wear conditions exist. Thus, it would be desirable to provide pyrolytic graphite articles for use under erosion conditions which had their surface perpendicular to the plane of deposition which does not have such a layer structure in the direction of shear thereby reducing the removal of particles by shearing.

It is an object of my invention to provide composite pyrolytic graphite articles.

It is another object of my invention to provide composite pyrolytic graphite articles in which the surface perpendicular to the plane of deposition is subjected to erosion conditions.

It is a further object of my invention to provide composite pyrolytic graphite articles in which a pyrolytic graphite layer bonds the article together.

In carrying out my invention in one form, a composite article is formed of a plurality of stacked pyrolytic graphite plates, in which each plate has its plane of deposition in parallel relationship to adjacent plates, and a pyrolytic graphite layer between each of the plates to bond the plates together.

These and various other objects, features, and advantages of the invention will be better understood from the following description taken in connection with the accompanying drawing in which:

FIGURE 1 is a partial sectional view of a pyrolytic graphite composite article made in accordance with my invention; and FIGURE 2 is a sectional view of a pyrolytic graphite rocket nozzle made in accordance with my invention.

In FIGURE 1 of the drawing, a composite article is shown generally at 10 which comprises a plurality of stacked pyrolytic graphite plates with a pyrolytic graphite layer 12 between the stacked plates and surrounding the surface of these plates to bond the plates together. The plates are shown as being of unform thickness although non-uniform plates may be employed in the article. Each of the plates, which has its plane of deposition in parallel relationship to adjacent plates, is produced from carbonaceous gases by thermal decomposition or from a carbonaceous material by evaporation and deposition on a surface. If it is desired, adjacent plates can have grooves machined therein to provide mating surfaces. Pyrolytic graphite layer 12 is deposited on stacked plates 11 from carbonaceous gases by thermal decomposition or from a carbonaceous material by evaporation and deposition. The edges 13 of plates 11, which are perpendicular to the plane of deposition, are covered by coating 12 as well as the voids between plates 11 to bond plates 11 together. At least one aperture can also be provided in each plate to form a central aperture through the article.

In FIGURE 2 of the drawing, a rocket nozzle is shown generally at 14 which comprises a plurality of pyrolytic graphite plates in the form of rings 15 stacked together and provided with a central aperture 16. A pyrolytic graphite layer 17 covers the exterior surface of rings 15 and fills the voids between rings 15 as at 18 with pyrolytic graphite to bond the rings together to form a composite article. If it is desired, an additional pyrolytic graphite layer can be applied to the interior surface of rings 15. Layer 7 covers the edges of rings 15 which are perpendicular to the plane of deposition of these rings and perpendicular to the axis of the nozzle.

Although the rate of chemical attack is greater on the free surface of a pyrolytic graphite article which is perpendicular to the plane of deposition of the plates forming the article rather than on the surface in the plane of deposition, I found that the free surface was less subject to erosion when the article was subject to abrasive wear or corrosive atmospheric conditions involving erosion by a high velocity gas stream. Normally, the surface of a pyrolytic graphite article subject to erosion conditions is in the plane of deposition of the pyrolytic graphite since the graphite crystallites are aligned into a layer structure in that plane. The surface of a pyrolytic graphite article which is perpendicular to the plane of deposition does not have such a layer structure in the direction of shear thereby reducing removal of particles by shearing.

I found further that loss in dimensions at the surface of pyrolytic graphite occurred at a lower rate if the surface were composed of layers deposited as flat plates rather than surfaces having small radii of curvature. It is desirable to avoid curved surfaces on pyrolytic graphite deposites because of the tendency of the material to distort as a result of the anisotropy in expansion coefficients. Thus, cracking is produced in shear between layers and can extend across layers when distortion is inhibited by geometric restraint.

Pyrolytic graphite plates are formed by deposition from carbonaceous gases or by evaporation and deposition from a carbonaceous material. I found that a plurality of these plates could be bonded together with a pyrolytic graphite layer by deposition from carbonaceous gases or by evaporation and deposition of a carbonaceous material. The layer filled the voids between the plates to bond the plates together and covered the edges of the plates. The composite article formed by this invention exposes the coated edges thereof to the erosion conditions rather than the plane of deposition surface. In this manner, the erosion of the article is less severe than when the plane of deposition surface was employed. As shown in FIGURE 2, such a composite article can be formed into a rocket nozzle by stacking a plurality of rings having a central aperture therethrough and depositing on the exterior surface of the rings and voids therebetween a pyrolytic graphite layer. Thus, the ring edges rather than the deposition surface of the pyrolytic graphite article are exposed to the eroding effects of atmospheric conditions during operation of the nozzle.

While the pyrolytic graphite plates, including rings, can be made by various methods, the following method is set forth as one manner in which to produce these plates. Sheets of commercial graphite are spaced apart within an enclosure of commercial graphite to provide passages between the sheets. The enclosure is positioned within an evacuation chamber and surrounded by insulation and a heating source in the form of heating coils.

The chamber atmosphere is maintained between a pressure of 0.5 mm. of mercury to 760 mm. of mercury during deposition. An uncorrected optical pyrometer temperature of 1950° C. to 2300° C. is employed to produce a high density plate. A carbonaceous gas, such as methane, is supplied at the rate of 20 to 150 cubic feet per hour to a preheater where the gas is formed into a carbon vapor. The vapor is fed to the enclosure and deposits on the sheets as it flows through the passages. The time of deposition is dependent on the desired thickness of the plates. After the process is discontinued, the apparatus is cooled to room temperature at which time the plates are removed from the graphite sheets.

For example, a plurality of pyrolytic graphite plates having a thickness of 0.030 inch formed by the above process were stacked together with the plane of deposition of each plate in parallel relationship to adjacent plates within an evacuation chamber. Methane gas, which was heated to a temperature of between 1850° C. to 1900° C., was admitted to the chamber as a carbon vapor. The chamber atmosphere was at a pressure of 1 mm. of mercury during deposition. After a period of three hours, the process was discontinued and the apparatus cooled to room temperature. The composite article had a pyrolytic graphite layer surrounding the plate surfaces and between the plates bonding the plates together. If it is desired, a lower temperature range, such as 700° C. to 1100° C., can be employed.

While other modifications of this invention and variations of article which may be employed within the scope of the invention have not been described, the invention is intended to include such that may be embraced within the following claims.

What I claim as new and desire to secure by Letters Patent of the United States is:

1. A composite article comprising a plurality of pyrolytic graphite plates stacked together, each of said plates having at least one aperture therethrough communicating with adjacent plate apertures, each of said plates stacked with its plane of deposition perpendicular to the axis of said aperture, and a pyrolytic graphite layer between each of said plates bonding said plates together.

2. A composite article comprising a plurality of pyrolytic graphite plates stacked together, each of said plates bonded to its adjacent plates, each of said plates having at least one aperture therethrough communicating with adjacent plate apertures, and each of said plates having its plane of deposition perpendicular to the axis of said aperture.

3. A rocket nozzle comprising a plurality of pyrolytic graphite rings stacked together, each of said rings having its plane of deposition perpendicular to the axis of said nozzle, and a pyrolytic graphite coating between each of said rings bonding said rings together.

4. A rocket nozzle comprising a plurality of pyrolytic graphite rings stacked together, each of said rings bonded to its adjacent rings, and each of said rings having its plane of deposition perpendicular to the axis of said nozzle.

References Cited by the Examiner
UNITED STATES PATENTS

| | | |
|---|---|---|
| 473,841 | 4/92 | Hulin. |
| 2,116,848 | 5/38 | Reed _____ 23—209.4 |
| 2,121,463 | 6/38 | Wisdom _____ 23—209.4 |
| 2,138,249 | 11/38 | Wilcox _____ 23—209.4 |
| 2,488,624 | 11/49 | Greaves et al. |
| 2,773,744 | 12/56 | Antonsen _____ 23—209.4 |
| 2,795,440 | 6/57 | Holycross et al. |
| 2,926,490 | 3/60 | Eaton et al. _____ 60—35.6 |
| 2,927,879 | 3/60 | Jones. |
| 3,004,386 | 10/61 | Ledwith _____ 60—35.6 |
| 3,055,789 | 9/62 | Gemmi. |
| 3,073,111 | 1/63 | Hasbrouck _____ 60—35.6 |

FOREIGN PATENTS 274,883    8/28    Great Britain.

ALEXANDER WYMAN, *Primary Examiner*

CARL F. KRAFFT, HAROLD ANSHER, EARL M. BERGERT, *Examiners.*